United States Patent [19]

Youngblood

[11] 3,779,898
[45] Dec. 18, 1973

[54] CATALYTIC CRACKING OF HYDROCARBONS WITH ZEOLITE CATALYSTS

[75] Inventor: Douglas J. Youngblood, Groves, Tex.

[73] Assignee: Texaco Inc., New York, N.Y.

[22] Filed: Dec. 28, 1970

[21] Appl. No.: 102,245

[52] U.S. Cl............ 208/120, 208/DIG. 2, 208/152, 208/164
[51] Int. Cl. .......................... B01j 9/20, C01b 33/28
[58] Field of Search............................ 208/120, 152

[56] References Cited
UNITED STATES PATENTS

| | | | |
|---|---|---|---|
| 3,554,903 | 1/1971 | Wilson................................ | 208/164 |
| 3,135,683 | 6/1964 | Mitchell............................... | 208/78 |
| 3,393,147 | 7/1968 | Dwyer et al. ........................ | 208/120 |
| 3,595,611 | 7/1971 | McDaniel et al. ..................... | 23/111 |
| 3,149,924 | 9/1964 | Cross................................... | 23/288 |
| 3,553,104 | 1/1971 | Stover et al.......................... | 208/120 |
| 3,518,051 | 6/1970 | Maher et al. .......................... | 23/111 |
| 3,449,070 | 6/1969 | McDaniel et al. ..................... | 23/111 |
| 3,384,602 | 5/1968 | Robinson............................. | 252/455 |
| 3,140,253 | 7/1964 | Plank et al........................... | 208/120 |
| 3,247,098 | 4/1966 | Kimberlin et al.................... | 208/120 |
| 3,325,397 | 6/1967 | Plank et al........................... | 208/120 |
| 3,329,628 | 7/1967 | Gladrow et al. ..................... | 252/253 |

*Primary Examiner*—Delbert E. Gantz
*Assistant Examiner*—G. E. Schmitkons
*Attorney*—Thomas H. Whaley and Carl G. Ries

[57] ABSTRACT

Significant improvements in catalyst activity and selectivity are achieved in the catalytic cracking of hydrocarbons with catalysts of the zeolite type when the ratio of fresh catalyst addition to catalyst loss is maintained above 1.5 and the catalyst is heat treated at between 1,300° and 1,600° F. for between 5 minutes and 24 hours. The heat treatment is performed on either the fresh catalyst being added or on the combined mixture of fresh catalyst and equilibrium catalyst. Increases in Texaco D + L activity of between 1 and 10 may be achieved with concomitant increases in naphtha selectivity with naphtha yield at constant conversion being increased as much as 5 volume percent.

6 Claims, No Drawings

CATALYTIC CRACKING OF HYDROCARBONS WITH ZEOLITE CATALYSTS

BACKGROUND OF THE INVENTION

This invention relates to the catalytic cracking of hydrocarbons with catalysts of the crystalline zeolite type. In particular, this invention relates to increasing the catalyst activity and selectivity above that obtained heretofore.

In the fluid catalytic cracking process, hydrocarbons are contacted with catalysts of various types to effect transformation of the hydrocarbons to desirable products such as gasoline, liquefied petroleum gas, alkylation feedstocks and middle distillate blending stocks. There is, however, a concomitant by-product formation of coke and gas which is often undesirable. A particularly deleterious by-product of the process is coke which during the course of the hydrocarbon conversion is deposited upon the catalyst. Since the coke deposition reduces the catalyst activity and particularly the catalyst selectivity, catalyst is continuously withdrawn from the reactor and passed through a regeneration zone where it is contacted with an oxygen-containing gas effecting combustion of substantial portions of the coke resulting in regeneration of the catalyst and returning it in large measure to its former activity. However, due to localized overheating within the regenerator repeated exposure of the catalyst to excessive high temperature results in a gradual decline in the activity of the regenerated catalyst. Both the amorphous silica-alumina catalysts in use heretofore and the newer, more active catalysts of the crystalline aluminosilicate type, which are finding wide application throughout the petroleum industry, are sensitive to this localized overheating often encountered in fluid catalytic cracking regenerators. Exposure or crystalline aluminosilicate-containing catalysts in that portion of the regenerator where spent catalysts first contact air richest in oxygen resulting in hot spots in the order of 1650°F. and higher results in deactivation of the zeolite catalysts through destruction of the crystalline integrity of the aluminosilicate structure. However, even though only a small portion of the original zeolite content may remain in these catalysts after heat damage they still possess much higher catalytic activity than the amorphous silica-alumina catalysts.

Attrition of the catalytic cracking catalyst is a constant problem. While the cracking catalyst is transported between the regenerator and reactor vessels and circulated through the fluid beds in these vessels it is subjected to severe abrading, resulting in fragmenting of the catalyst pellet. Although the finely divided catalytic material possesses high activity it is not retained within the catalytic cacking unit but is lost through regenerator stack gases and fractionator bottoms. Generally the loss of catalyst can amount to about 0.1 to 2.0 weight percent of the catalyst inventory per day. About 75 percent of the catalyst losses normally occur through the regenerator stack gases with the remainder being lost through fractionator bottoms. Catalyst depletion by virtue of this attrition and loss must be alleviated by periodic, and normally, daily, additions of fresh catalyst to maintain the catalyst inventory at design level.

Although addition of fresh catalyst maintains catalyst inventory at required levels and prevents the equilibrium catalyst from decreasing in activity, there is still a significant difference between the activity of the combined fresh catalyst and equilibrium catalyst and that attainable by heat treating the fresh catalyst. A small increase in activity, even an increase of 1.0 in Texaco D + L activity, can result in substantial and significant increase in the economic value of the products. In addition, an increase in activity is accompanied by a significant increase in selectivity further enhancing the economic advantage of activity increases. Therefore any modification to the fluid catalytic cracking process, the catalyst or the operating conditions which enhances the activity and selectivity is highly desirable.

SUMMARY

Broadly, this invention is directed to improvements in fluid catalytic cracking of hydrocarbons with catalysts of the crystalline zeolite type wherein the catalyst activity and selectivity are substantially increased by a combination of high fresh catalyst addition to equilibrium catalyst loss ratios and heat treating of the catalyst at temperatures above 1300°F. Specifically, the improvements are directed to additions of fresh catalyst in a ratio of catalyst addition to catalyst loss greater than 1.5 and heat treating either the fresh catalyst or all or a portion of the combined mixture of fresh and equilibrium catalyst at temperatures between about 1300° and 1600°F. for 5 minutes to 24 hours.

DESCRIPTION OF THE PREFERRED EMBODIMENTS

Broadly, I have found that significant improvements can be made in the catalytic cracking of hydrocarbons with catalysts of the crystalline zeolite type where fresh catalyst is added in a ratio of fresh catalyst addition to equilibrium catalyst loss greater than about 1.5 and subjecting the mixture of equilibrium catalyst and fresh catalyst to a high temperature heat treatment. Alternately, the heat treatment may be confined to the fresh catalyst addition.

My invention contemplates improvements in the catalytic cracking of hydrocarbons involving fresh catalyst additions and heat treatment of the catalyst. These improvements comprise:

a. adding fresh catalytic cracking catalyst of the crystalline zeolite type to the inventory of equilibrium catalyst at a ratio of fresh catalyst addition to equilibrium catalyst loss greater than about 1.5, b. withdrawing equilibrium catalyst from the catalyst inventory to maintain the catalyst inventory at a substantially constant value, and c. subjecting the mixture of equilibrium catalyst and fresh catalyst to a temperature of 1300° to 1600°F. for a period of between 5 minutes and 24 hours.

In an alternate embodiment the heat treatment step is limited to treating the fresh catalyst rather than the mixture of equilibrium and fresh catalyst. Broadly, the improvements of this embodiment comprise:

a. subjecting fresh catalytic cracking catalyst of the crystalline zeolite type to a temperature of 1300° to 1600°F. for a period of between 5 minutes and 24 hours, b. adding the treated catalyst from step (a) to the inventory of equilibrium catalyst at a ratio of treated catalyst addition to equilibrium catalyst loss greater than about 1.5, and c. withdrawing equilibrium catalyst from the catalyst inventory to maintain the catalyst inventory at a substantially constant value.

This invention relates particularly to fluid catalytic cracking of hydrocarbons employing catalytic cracking catalysts of the zeolite type. These catalysts comprise an active metal oxide, as exemplified by silica-alumina or clay, and a large port crystalline alumino-silicate, customarily referred to as a zeolite. The zeolites employed in these cracking catalysts possess ordered rigid three-dimensional structures having uniform pore diameters within the range of about 5 to about 15A. The crystalline zeolite catalysts to which these improvements are directed comprise about 1 to 50 weight percent zeolite, about 10 to 50 weight percent alumina with the balance being silica. Among the preferred zeolites are those known as zeolite X, zeolite Y and mordenite wherein at least a substantial portion of the original alkali metal ions have been replaced with such cations as hydrogen and/or metal or combinations of metals such as barium, calcium, magnesium, manganese or rare earth metals, for example, cerium, lanthanum, neodymium, praeseodymium, samarium and yttrium.

In describing my invention, the terms "fresh" catalyst and "equilibrium" catalysts have been used. By fresh catalyst, I mean a catalyst of the zeolite type as described hereinbefore which has been prepared but has not been utilized as a catalyst in a hydrocarbon conversion reaction. Thus, a catalyst "as received" from a catalyst manufacturer for use as a catalyst and which is added periodically to an operating catalytic cracking unit is an example of "fresh" catalyst. After the "fresh" catalyst is added to the catalyst inventory the properties of the catalyst gradually undergo minor changes eventually reaching a substantially constant value. For example, catalyst activity and selectivity generally and gradually decline eventually reaching some equilibrium value. This has been explained by the fact that while carbonaceous material is being removed from the catalyst during regeneration it is subjected occasionally to excessively high temperatures in sections of the regenerator resulting in deterioration of the crystalline structure of the zeolite portion of the catalyst and modification of its catalytic properties. After repeated regenerations and utilization as a cracking catalyst the entire inventory of catalyst attains an equilibrium condition regarding its catalytic cracking qualities. Thus, the catalyst inventory of an operating catalytic cracking unit is composed of this "equilibrium" catalyst.

Regarding the activity and selectivity of these catalysts, it is not unusual that "fresh" zeolite catalyst has the following properties after heat treatment: Texaco D + L activity of between about 40 and 70 and a selectivity of between about 0.65 and 0.80. The Texaco D + L activity test is described in 26 Petroleum Refiner No. 12,94 (1947). "Selectivity," in this instance, is defined as the volume percent of debutanized naphtha divided by the volume percent conversion of gas oil. After operation for a period of time during which exposure to regeneration temperatures and continuous use have reduced the catalytic properties of the aluminosilicate composition and during which periodic additions of fresh catalyst have been made to maintain catalyst inventory, the equilibrium catalyst exhibits a Texaco D + L activity of between 25 and 40 and a selectivity of between about 0.64 and 0.75.

By the improvements of my invention which relate to a fluid catalytic cracking process, the activity and selectivity of equilibrium catalyst can be increased significantly over that obtained heretofore when the fresh catalyst additions are made in a ratio of fresh catalyst to catalyst loss which is greater than about 1.5, preferably where the ratio is between 2 and 2.5. When fresh catalyst additions are made, equilibrium catalyst must, of course, be removed to maintain the catalyst inventory at a substantially constant value. In other words, the ratio of fresh catalyst addition to catalyst loss plus equilibrium catalyst withdrawal must be 1.0 to maintain catalyst inventory at a constant level.

Heat treatment of the catalyst is necessary to achieve the maximum benefits of this process. Either the mixture of equilibrium catalyst and fresh catalyst may be heat treated or the heat treatment may be limited to only the fresh catalyst addition. The heat treatment temperatures should be between 1300° and 1600°F. The heating should be conducted for at least 5 minutes and although the catalyst may be exposed beneficially to these temperatures for periods in excess of 200 hours a practical upper limit for the heating period is about 24 hours. Preferably, the heat treatment is conducted between 1400° and 1550°F. for a period of between 15 and 200 minutes. Directionally the heat treatment should be conducted for shorter periods of time when the higher temperature levels are used. The treatment is conducted in the absence of addes steam but air, flue gas, nitrogen or other inert gases may be maintained in contact with the catalyst during the heat treatment.

If only the fresh catalyst is being treated the treatment may be performed continuously while the catalyst is being added or in batches before the catalyst is added. When the mixture of catalyst is to be heat treated, a small slip stream or side stream of catalyst may be withdrawn at a point downstream from the fresh catalyst addition. This side stream may then be heat treated and returned at an appropriate place in the unit, preferably where the regenerated catalyst is being returned to the reactor.

By utilizing the process of this invention higher activity and selectivity levels are obtained than have been obtained heretofore. The following exemplifies the practice of this invention.

EXAMPLE I

A series of tests was made with commercial szie fluid catalytic cracking units using three different catalysts of the crystalline zeolite type. These catalysts and their properties are described in Table I below.

TABLE I

| Zeolite Catalyst | A | B | C |
|---|---|---|---|
| Zeolite type | X | X | Y |
| Matrix | Silica-alumina | Silica-alumina | Silica-alumina |
| Surface Area, m²/g. | 279 | 329 | 327 |
| Pore Volume, cc/g | 0.58 | 0.72 | 0.77 |
| Zeolite content, wt. % | 11 | 18 | 3 |
| Rare Earth Content, wt. % | 1.2 | 2.9 | 0.6 |
| Activity of "Fresh" Catalyst, Texaco D + L[1] | 32 | 35 | 31 |

Notes
[1] Before heat treatment

In a series of plant runs, the effect of high catalyst addition to loss ratios and heat treatment of the catalyst was investigated. The mixture of equilibrium catalyst and fresh catalyst was heat treated at 1400°F for 17 hours. The results obtained are presented in Table II below. Similar results are obtained where the heating time is less than 200 minutes.

From the results of these tests, it is apparent that both activity and selectivity are substantially increased by a combination of high addition/loss ratios plus heat treatment of the mixtures of fresh and equilibrium catalyst. The catalysts from the higher addition/loss ratio runs generally had better activity and selectivity.

TABLE II

| Catalyst | Catalyst Addition/ Loss Ratio | Before Heat Treatment | | After Heat Treatment | | Increase In DB Naphtha Yield[3] (Vol. %) |
|---|---|---|---|---|---|---|
| | | Activity[1] | Selectivity[2] | Activity[1] | Selectivity[2] | |
| A | 1.1 | 24 | 0.713 | 25 | 0.725 | 0.84 |
| B | 1.0 | 23 | 0.715 | 29 | 0.716 | 0.07 |
| | 1.2 | 29 | 0.719 | 35 | 0.768 | 3.43 |
| | 2.6 | 33 | 0.683 | 36 | 0.758 | 5.25 |
| C | 1.4 | 26 | 0.698 | 29 | 0.704 | 0.42 |
| | 2.3 | 39 | 0.710 | 43 | 0.732 | 1.54 |

Notes
1. Texaco D + L Activity
2. Ratio of vol. % debutanized (DB) naphtha yield to vol. % gas oil conversion
3. At a constant gas oil conversion of 70 vol. %

EXAMPLE II

To demonstrate the effect of heat treating on the fresh catalyst, a series of four runs was conducted with fresh catalyst B and equilibrium catalyst B.

A sample of equilibrium catalyst B from a refinery catalytic cracking unit was divided into four portions. Activity and selectivity data were obtained on one portion. The other three portions were blended with fresh catalyst B as received from the manufacturer and also after heat treatment. Activity and selectivity data were obtained on these three blends. Results are shown in Table III. Similar results are obtained where the heating time of Run 4 is less than 200 minutes.

These tests show that heat treatment of only the fresh catalyst improves the activity and selectivity of the mixture of fresh and equilibrium catalyst.

TABLE III

| Run No.: | 1 | 2 | 3 | 4 |
|---|---|---|---|---|
| Catalyst composition (wt. %): | | | | |
| Fresh Catalyst B | | 25 wt. % | 25 wt. % | 25 wt. %. |
| Equilibrium Catalyst B | 100% | 75 wt. % | 75 wt. % | 75 wt. %. |
| Heat treatment of fresh catalyst | | None | 1600° F., 20 min. | 1480° F., 17 hrs. |
| Activity[1] | 30 | 34 | 37 | 40. |
| Selectivity[2] | 0.658 | 0.642 | 0.665 | 0.668. |
| Increase in DB naphtha yield (vol. %).[3] | | 0 | 1.61 | 1.82. |

NOTES:
[1] Texaco D+L.
[2] Ratio of vol. percent debutanized (DB) naphtha yield to vol. percent gas oil conversion.
[3] Increase over Run 2, at constant gas oil conversion of 70 vol. percent.

I claim:

1. In the catalytic cracking of hydrocarbons with a catalyst comprising an active metal oxide and a crystalline zeolite, said catalyst having been rendered catalytically active during its preparation by a process comprising calcining and/or steam treatment, wherein periodic additions of catalyst are made to maintain catalyst inventory which is gradually and continually depleted through attrition and loss, the improvement which comprises:

a. adding fresh catalytic cracking catalyst comprising an active metal oxide and a crystalline zeolite to the inventory of equilibrium catalyst at a ratio of fresh catalyst addition to equilibrium catalyst loss greater than about 1.5, b. withdrawing equilibrium catalyst from the catalyst inventory to maintain the catalyst inventory at a substantially constant value, and c. subjecting the mixture of equilibrium catalyst and fresh catalyst to a temperature of 1300° to 1600°F. for a period of between 5 minutes and 24 hours.

2. A process according to claim 1 wherein in step (a) the ratio is between 2.0 and 2.5.

3. A process according to claim 1 where in step (c) the temperature is 1400° to 1550°F. for a period of between 15 and 200 minutes.

4. In the catalytic cracking of hydrocarbons with a catalyst comprising an active metal oxide and crystalline zeolite, said catalyst having been rendered catalytically active during its preparation by a process comprising calcining and/or steam treatment, wherein periodic additions of catalyst are made to maintain catalyst inventory which is gradually and continually depleted through attrition and loss, the improvement which comprises:

a. subjecting fresh catalytic cracking catalyst comprising an active metal oxide and a crystalline zeolite to a temperature of 1300° to 1600°F. for a period of between 5 minutes and 24 hours, b. adding the treated catalyst from step (a) to the inventory of equilibrium catalyst at a ratio of treated catalyst addition to equilibrium catalyst loss greater than about 1.5, and c. withdrawing equilibrium catalyst from the catalyst inventory to maintain the catalyst inventory at a substantially constant value.

5. A process according to claim 4 where in step (a) the temperature is 1400° to 1550°F. for a period of between 15 and 200 minutes.

6. A process according to claim 4 where in step (b) the ratio is between 2.0 and 2.5.

* * * * *